(12) United States Patent
Chen

(10) Patent No.: US 11,300,760 B2
(45) Date of Patent: Apr. 12, 2022

(54) TELEPROMPTER

(71) Applicant: SHENZHEN BESTVIEW ELECTRONIC CO., LTD, Shenzhen (CN)

(72) Inventor: Qinyuan Chen, Shenzhen (CN)

( * ) Notice: Subject to any disclaimer, the term of this patent is extended or adjusted under 35 U.S.C. 154(b) by 136 days.

(21) Appl. No.: 16/848,812

(22) Filed: Apr. 14, 2020

(65) Prior Publication Data

US 2021/0278625 A1 Sep. 9, 2021

(30) Foreign Application Priority Data

Mar. 9, 2020 (CN) .......................... 202020278189.1

(51) Int. Cl.
*G02B 7/182* (2021.01)
*H04M 1/02* (2006.01)
*H04N 5/222* (2006.01)

(52) U.S. Cl.
CPC .......... *G02B 7/182* (2013.01); *H04M 1/0272* (2013.01); *H04N 5/2222* (2013.01); *H04M 2250/54* (2013.01)

(58) Field of Classification Search
CPC ............... G02B 7/182; H04M 1/0272; H04M 2250/54; H04M 2250/52; H04M 1/04; H04N 5/2222
USPC ...................................................... 359/871
See application file for complete search history.

(56) References Cited

U.S. PATENT DOCUMENTS

2009/0256970 A1* 10/2009 Bilbrey ............... H04N 5/2222
348/722
2019/0045143 A1* 2/2019 Williams, IV ......... F16M 11/40

\* cited by examiner

*Primary Examiner* — Euncha P Cherry

(57) ABSTRACT

The technical solution of the disclosure discloses a teleprompter, which includes a teleprompter reflector mechanism and a display support mechanism. The display support mechanism is located on the front side of the teleprompter reflector mechanism. The teleprompter further includes a clamping mechanism, which is configured to be removably connected with different positions on the back side of the teleprompter reflector mechanism. When using, a smart terminal can be clamped in the clamping mechanism so as to align the smart terminal with the shoot hole for shooting. The technology realizes to combine the smart terminal shoot with the teleprompter, so that users are convenient to use, and does not need to take additional cameras, thereby making it easy to take and reducing labor intensity.

9 Claims, 5 Drawing Sheets

TELEPROMPTER

TECHNICAL FIELD OF THE INVENTION

The disclosure relates to the technical field of a teleprompter equipment, especially a teleprompter which can clamp a mobile device, such as a mobile phone.

BACKGROUND OF THE INVENTION

The teleprompter displays the contents of a document via a high-brightness display device, and reflects the content displayed by the display device onto a 45-degree coated glass in front of a camera lens to reflect lines so that a speaker can face the camera while looking at the lines. The speaker, teleprompter, camera, tripods support on the same axis, resulting in the speaker's intimacy of facing the audience, and improving the quality of a speech.

With the development of technology, there are more and more kinds and structures of the teleprompter. However, most of the teleprompters are focused on shooting with the camera when using. It is also feasible to use smart terminals to replace the cameras on the premise that smart terminals (e.g. smartphones, tablets) are more widely used and shooting effect thereof is more and more clearly. However, the teleprompter in the art cannot fixed these smart terminals, so that the application of smart terminals on the teleprompter cannot be achieved.

Therefore, the above-mentioned technical issues need to be resolved.

SUMMARY OF THE INVENTION

In order to overcome the shortcomings of the art, the disclosure proposes a teleprompter, which aims to realize the use and clamp of a smart terminal in the teleprompter.

In order to solve the above-mentioned technical problems, the basic technical solution proposed by the disclosure is:

A teleprompter comprising a teleprompter reflector mechanism and a display support mechanism, wherein the display support mechanism is located on the front of the teleprompter reflector mechanism, the teleprompter further comprises a clamping mechanism, the clamping mechanism is configured to removably connect with different positions on the back side of the teleprompter reflector mechanism.

Further, the clamping mechanism comprises a clamping part, a fixing part, and a locking part, the clamping part is fixedly connected with the fixing part, the fixing part is removably connected with the different positions on the back side of the teleprompter reflector mechanism via the locking part.

Further, the clamping part is an integrated structure with the fixing part.

Further, the fixing part comprises a slide hole, the locking part comprises a connecting part, a constraint part, and a locking member, and a first end of the connecting part is fixedly connected with the constraint, the connecting part can pass through the slip hole, and the fixing part can move in a lateral direction so that the connecting part cases with the slide hole in different positions, the teleprompter reflector mechanism comprises a through hole arranged in the longitudinal direction at the teleprompter reflector mechanism; when assembling, a second end of the connecting part passes through the slip hole and the through hole, and extends to the front side of the teleprompter reflector mechanism and is threaded with the locking member so as to removably connect the fixing part on the back side of the teleprompter reflector mechanism.

Further, the slide hole is a rectangular hole along a lateral direction.

Further, the outer circumference of the connecting part close to the constraint part is provided with a square limit part, and the longitudinal size of the limit part (334) is consistent with the longitudinal size of the slide hole.

Further, the clamping part comprises a base part, a first clamping part, and a second clamping part, the base part is connected to the fixing part, the first clamping part is fixedly connected with the base part, the second clamping part is arranged, in the lateral direction and at intervals, over against the first clamping part, and the second clamping part is retractably arranged with the base part.

Further, the teleprompter reflector mechanism comprises a bracket, and a sunshade provided above the bracket, a shoot hole is provided at the sunshade, the clamping mechanism is provided on the bracket and is located below the shoot hole.

Further, the display support mechanism is arranged on the front side of the bracket, and is removably connected to the bracket.

Further, the display support mechanism comprises a frame, the upper and lower sides of the frame are provided with a retractable first clip and a retractable second clip respectively.

The beneficial effects of the disclosure are:

The technical solution of the disclosure proposes a teleprompter, which includes a teleprompter reflector mechanism and a display support mechanism. The display support mechanism is located on the front side of the teleprompter reflector mechanism. The teleprompter further includes a clamping mechanism, which is configured to be removably connected with different positions on the back side of the teleprompter reflector mechanism. When using, a smart terminal can be clamped in the clamping mechanism so as to align the smart terminal with the shoot hole for shooting. The technology realizes to combine the smart terminal shoot with the teleprompter, so that users are convenient to use, and does not need to take additional cameras, thereby making it easy to take and reducing labor intensity.

DETAILED DESCRIPTION OF THE EMBODIMENTS

FIGS. 1-5 will be combined to describe the technical solution in the embodiment of the disclosure clearly and completely. Obviously, the described embodiment is only a part of the implementation of the disclosure, rather than all of the embodiments. Based on the embodiments in the disclosure, all other embodiments obtained by an ordinary skilled person in the art without making creative work are within the scope of the protection of the disclosure.

Figure 1:
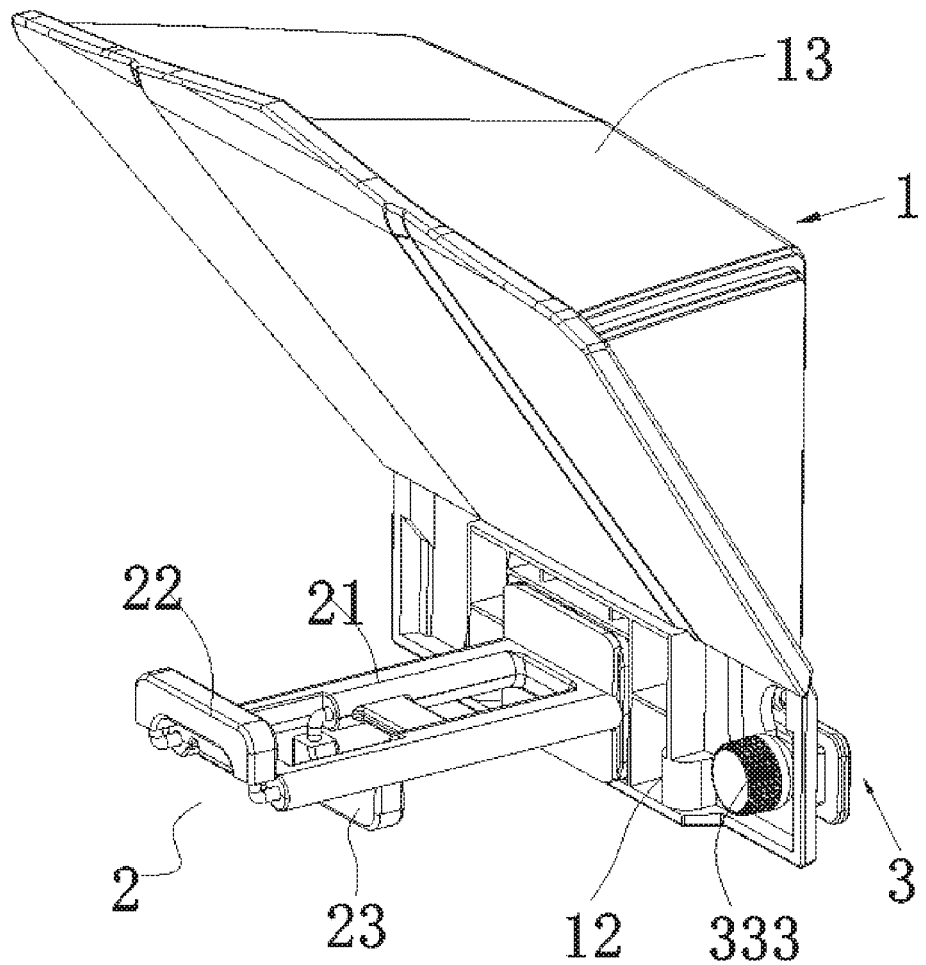
FIG. 1 is the first of the contour diagrams of a teleprompter for this disclosure.

It needs to be explained that if the embodiment of the disclosure has a direction to be shown in the drawings, for example, the front and rear is based on FIG. 1, specifically the left side of t FIG. 1 is the front, the right side of FIG. 1 is the rear. At the same time, as shown in FIG. 2, landscape is roughly in the left and right direction, portrait is in the up and down direction shown in the figure. if a particular attitude changes, the directional indication changes accordingly.

Figure 2:
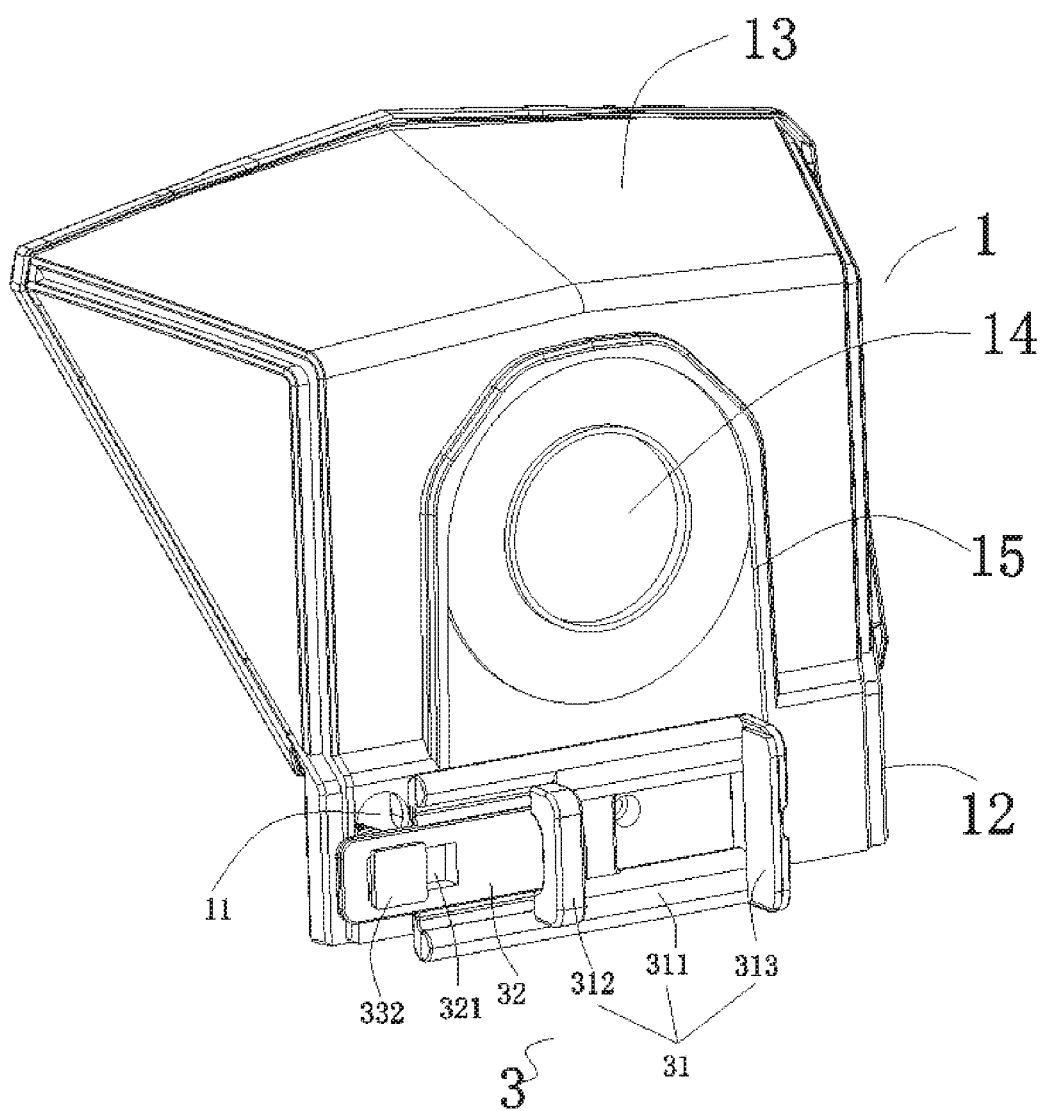
FIG. 2 is the second of the contour diagrams of a teleprompter for this disclosure.

Referring to FIG. 1 and FIG. 2, the embodiment proposes a teleprompter, which includes a teleprompter reflector mechanism 1 and a display support mechanism 2, the display support mechanism 2 is located on the front side of the teleprompter reflector mechanism 1. The teleprompter further includes a clamping mechanism 3, which is configured to be removably connected with different positions on the back side of the teleprompter reflector mechanism 1. The combination of the teleprompter and the smart terminal (e.g. a mobile phone) can be realized through this technology, and the smart terminal for replacing the camera can be used to shoot, thereby facilitating the user and provide a new choice of shooting use.

Specifically, the teleprompter reflector mechanism 1 is used to receive and display the information projected by the display. The teleprompter reflector mechanism 1 may be implemented in the existing well-known technology. Specifically, in this embodiment, the teleprompter reflector mechanism 1 specifically includes a bracket 12, and a sunshade 13 provided above the bracket 12. A shoot hole 14 is provided at the sunshade 13, a camera clamping interface 15 for fixing the camera is provided at the circumferential side of the shoot hole 14. Wherein, the bracket 12 and the sunshade 13 may adapt a fixed shape with an integrated structure, or a rotation connection with a reversible foldable sunshade. Among them, the bracket 12 could be made of metal material, so that the strength of the bracket 12 can be strengthened. In this embodiment, the bracket 12 is of basically a plate structure, arranged along the vertical direction.

Figure 3:
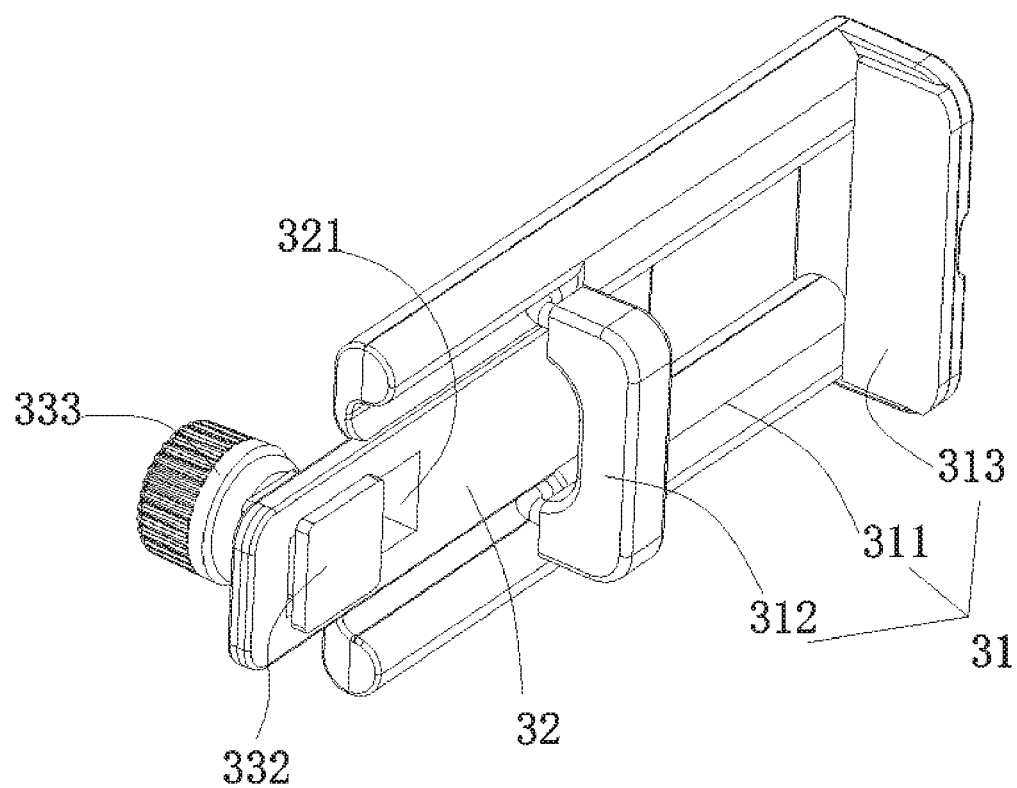
FIG. 3 is a structural diagram of the clamping mechanism.
Figure 4:
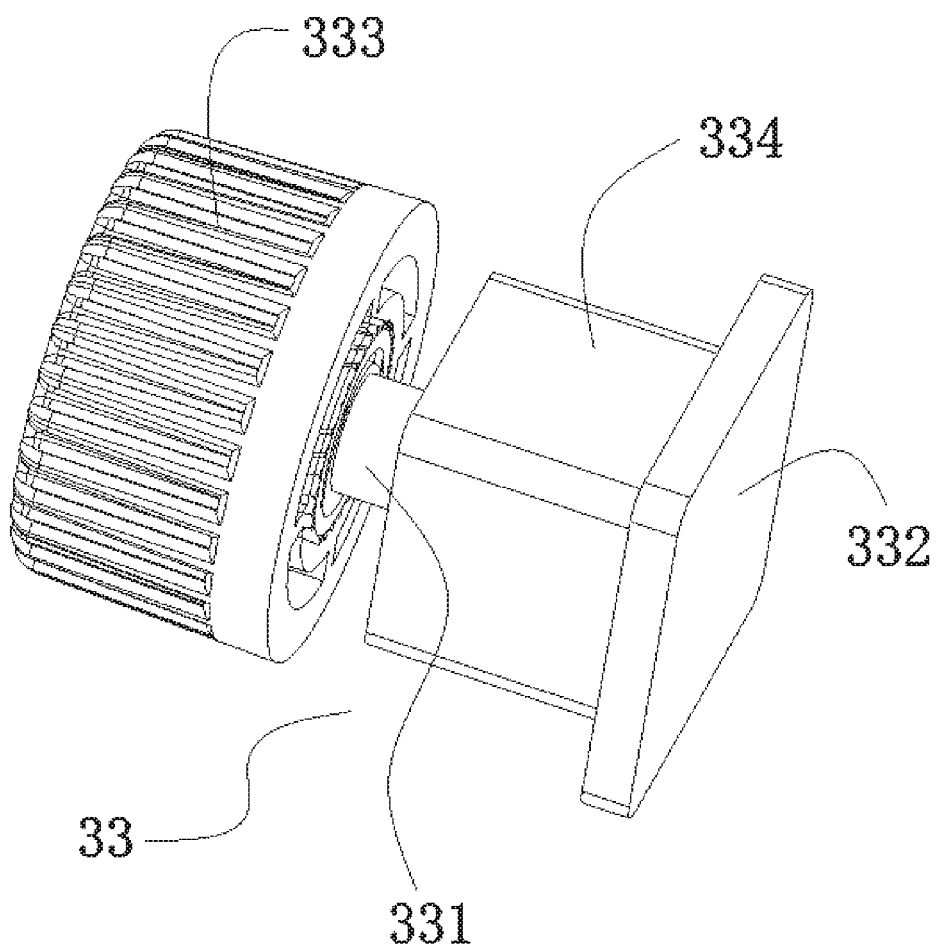
FIG. 4 is a structural diagram of the locking part.
Figure 5:
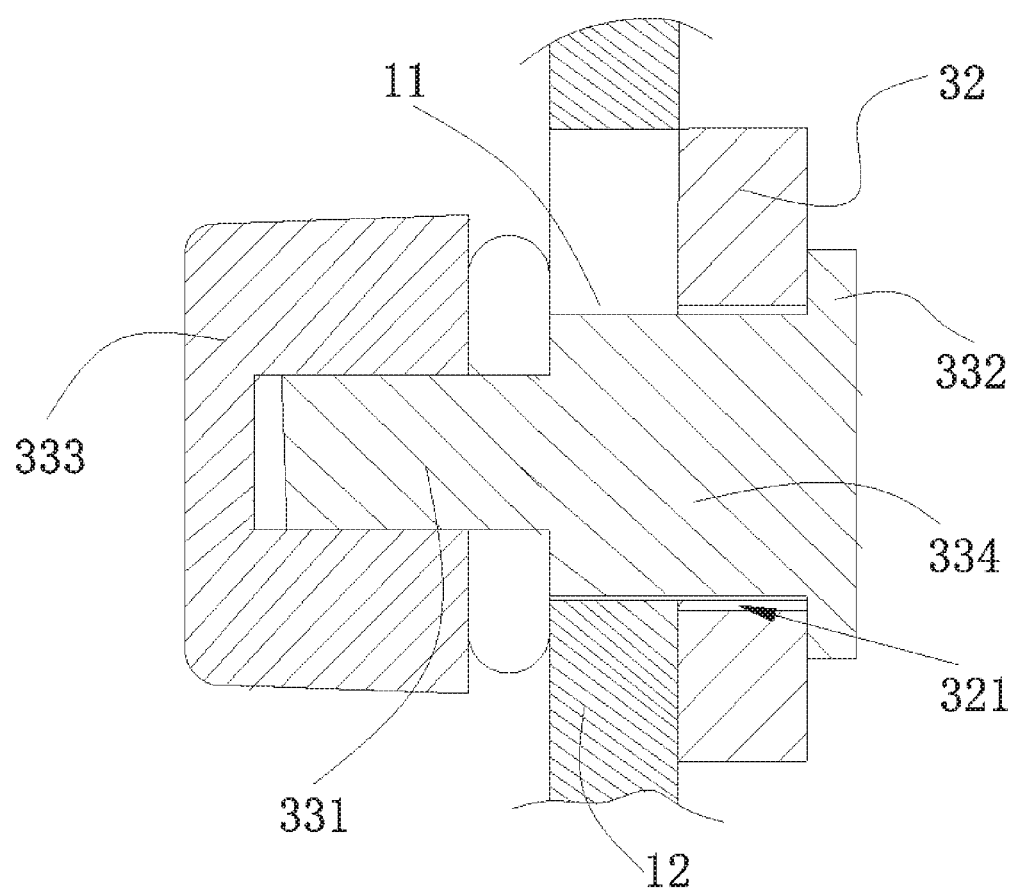
FIG. 5 is an assembly structure of the clamping mechanism and the bracket.

As shown in FIG. 2 and FIG. 3, the clamping mechanism 3 includes a clamping part 31, a fixing part 32, and a locking part 33, the clamping part 31 is fixedly connected with the fixing part 32, the fixing part 32 is removably connected with different positions on the back side of the teleprompter reflector mechanism 1 by the locking part 33. The clamping part 31 is used to clamp the smart terminal, such as a mobile phone, a tablet, etc. The fixing part 32 is fixedly connected with the clamping part 31, preferably, the clamping part 31 and the fixing part 32 have an integrated structure, specifically, the clamping part 31 and the fixing part 32 can be formed in one body when moulded. The locking part 33 is used to connect with the fixing part 32 so as to connect the fixing part 32 with the teleprompter reflector mechanism 1 together. That is, when using, the locking part 33 can fix the clamping piece 31 at a specific position of the teleprompter reflector mechanism 1 via the fixing part 32 for usage. Preferably, in this embodiment, the clamping mechanism 3 is provided on a bracket 12 and is located below the shoot hole 14. In this way, when used, the camera of the clamped smart terminal can be directed to the shoot hole 14 to realize a shoot operation. It should be understood, because different types of smart terminals have different size, the clamping mechanism 3 needs to be installed in different positions to make the camera of the smart terminal located in the canter of the shoot hole 14. Therefore, in this embodiment, the clamping mechanism 3 is configured to be removably connected with different positions on the back side of the teleprompter reflector mechanism 1. That is, according to the size of different smart terminal, the specific position of the clamping mechanism 3 cloud be adjusted to ensure that the camera of the smart terminal just towards the middle position of the shoot hole 14. Specifically, the position of the clamping part 31 can finally ensure the camera of the smart terminal just towards the shoot hole 14 by adjusting the fixed position of the fixing part 32, Wherein, the fixing mode of the fixing part 32 with the locking part 33 can be achieved by the existing technology, for example, the locking part 33 is a screw, the fixing part 32 is provided with a through-hole, the screw passing through the through-hole is threaded with a threaded hole provided on the teleprompter reflector mechanism 1 to realize fixation. Specifically, in order to be fixed at different positions, several different threaded holes could be provided on the teleprompter reflector mechanism 1. Of course, in addition, the fixing part 32 and clamping part 31 could be removably connected with the different positions of the teleprompter reflector mechanism 1 in any other proper ways that are known.

In this technical solution, the fixing part 32 is removably connected with the clamping part 31 in the following manner. Specifically, see FIG. 3 to FIG. 5, the fixing part 32 is provided a horizontal slide hole 321, the locking part 33 includes a connecting part 331, a constraint part 332, and a locking member 333, a first end of the connecting part 331 is fixedly connected with the constraint part 332, the connecting part 331 could pass through the slide hole 321. The fixing part 32 may move in a lateral direction so that the connecting part 331 is cased with the slide hole 321 in different positions. The teleprompter reflector mechanism 1 includes a through hole 11 provided in the teleprompter reflector mechanism 1 along the vertical direction. When assembling, a second end of the connecting part 331 passes sequentially through the slide hole 321 and the through hole 11, and then extends to the front side of the teleprompter reflector mechanism 1 and threaded with the locking member 333 so as to removably connect the fixing part 32 with the back side of the teleprompter reflector mechanism 1. Specifically, in this solution, the constraint part 332 is used to contact with the outer side of the fixing part 32 in order to press the fixing part 32 when locking, so that the fixing part 32 is closely matched with the teleprompter reflector mechanism 1 together to fix the entire clamping part 31.

It should be understood, the clamping part 31 in this embodiment can be provided with the different positions of the teleprompter reflector mechanism 1, specifically, by fitting between the slide hole 321 and the connecting part 331. As shown in FIG. 3, the size of the slide hole 321 in the lateral direction is greater than the lateral size of the connecting part 331, specifically, the slide hole 321 is able to slide along the connecting part 331, that is, the specific different fitting position between the connecting part 331 and the slide hole 321 can adjust the position of the clamping part 31. For example, when the connecting part 331 fits with a left-most end and a right-hand end of the slide hole 321, positions thereof are different. In this way, by adjusting the specific fitting position between the connecting part 331 and the slide hole 321, the position of the clamping part 31 is adjusted to meet the clamping needs of different smart terminals. In addition, in order to realize a removable connection, the locking member 333 is threaded with the second end of the connecting part 331. That is, when the locking member 333 is tighten with the connecting part 331, the fixation is obtained so that the removable connection can be obtained after the locking member 333 is removed from the connecting part 331. Wherein, the locking member 333 is of a knob structure, provided with an internal threaded hole. When assembled, the internal threaded hole of the locking member 333 is threaded with the second end of the connecting part 331.

Preferably, in this embodiment, the slide hole 321 is a rectangular hole provided along the lateral direction. The length of the slide hole 321 is determined according to the need, for example, the lateral length of the slide hole 321 could be double of the lateral size of the connecting part 331, and certainly not limited to this.

In order to ensure that the clamping part 31 will not be loosened during the use process, the outer circumference of the connecting part 331 close to the constraint part 332 is provided with a square limit part 334. The longitudinal dimension of the limit part 334 is consistent with the longitudinal dimension of the slide hole 321. That is, the upper and lower end face of the limit part 334 contact with the upper and lower end face of the slide hole 321 respectively, so as to ensure that the limit part 334 and the slide hole 321 can only slide along the lateral direction, and ensure that the clamping part 31 in the use process will not rotate around the connecting part 331 via the fitting constraint between the limit part 334 and the slide hole 321, for ensuring the stability of the use process. In addition, in order to prevent the whole clamping mechanism 3 in the use process from rotating around the through hole 11, the limit portion 334 extends in the thickness direction into the through hole 11. An assembled section of the through hole 11 is a square hole, and the lateral size of the through hole 11 is consistent with the lateral size of the limit portion 334, thereby ensuring a restraint by the contact between the two sides in the lateral direction of the through hole 11 and in the lateral direction of the limit part 334 respectively, and preventing the limit part 334 from rotating in the through hole 11. Specifically, a longitudinal section of the limit part 334 is a shape of square. The lateral size of the through hole 11 is consistent with the longitudinal size of the limit part 334 and of the longitudinal size of the slide hole 321, thereby ensuring the stability of the entire clamping mechanism 3 in the use process.

See FIG. 3, the clamping part 31 in this embodiment includes a base part 311, a first clamping part 312, and a second clamping part 313, wherein the base part 311 is fixedly connected to the fixing part 32, the first clamping part 312 is fixedly connected to the base part 311. The second clamping part 313 is arranged, in the lateral direction and at intervals, over against the first clamping part 312, and the second clamping part 313 is retractably arranged with the base part 311. It should be understood, the retractable arrangement between the second clamping part 313 and the base part 311 in this embodiment could be implemented by using the well-known technology in the art, as long as the retractable elastic clamping of the second clamping part 313 can be ensured. When using, the smart terminal is fitted therebetween after the second clamping part 313 is pulled away from the first clamping part 312, and then the smart terminal is released. Specifically, in this embodiment, the second clamping part 313 is provided with rod structures being parallel in the upper and lower direction and at intervals, as shown in FIG. 3. The base part 311 includes the rod structures in the upper and lower direction and at intervals, one end of the two rod structures is connected to the first clamping part 312, and the middle position of another end of the two rod structures is connected to the fixing part 32, The second clamping part 313 is retractably connected to the two rod structures respectively.

In some embodiments, as shown in FIG. 1, the display support mechanism 2 is provided on the front side of the bracket 12, and is removably connected to the bracket 12. That is, the display support mechanism could be assembled only when using, and could be removed for carrying, storage and transport when not using. Specifically, the display support mechanism is threaded with the bracket 12 by a bolt.

Specifically, in order to clamp different size of the displays, the display support mechanism 2 includes a frame 21, the upper and lower sides of the frame 21 are provided with a retractable first clip 22 and a retractable second clip 23 respectively. Wherein, a clamping space formed by the first clip 22 is different with a clamping space formed by the second clip 23, as shown in FIG. 1, the distance between the upper first clip 22 and the bracket 12 is greater than the distance between the lower second clip 23 and the bracket 12, that is, the valid clamping spaces are different. Specifically, in use, which one of the first clip 22 and the second clip 23 is arranged upward according to the size of the specific display. For example, the first clip 22 is upward when assembling the frame 21 for a large display, while the second clip 23 is upward for a small display. In addition, it should be understood that the first clip 22 and the second clip 23 could be implemented by using the well-known technology in the art, as long as it could be retractable to clamp the display.

In a word, the technical solution of the disclosure realizes the function of the teleprompter clamping the smart terminal, which facilitates the use of the teleprompter.

According to the disclosure and teaching of the specification above-mentioned, the persons skilled in the art according to the disclosure may also make changes and modifications to the above embodiment. Therefore, the disclosure is not limited to the specific embodiments disclosed and described above, and some other modifications and changes to the disclosure should fall within the protection scope of the claims of the disclosure. In addition, although certain terms are used in this specification, they are only for convenience and do not impose any restrictions on the disclosure,

What is claimed is:

1. A teleprompter comprising a teleprompter reflector mechanism (1) and a display support mechanism (2), wherein the display support mechanism (2) is located on the front of the teleprompter reflector mechanism (1), the teleprompter further comprises a clamping mechanism (3), the clamping mechanism (3) is configured to removably connect with different positions on the back side of the teleprompter reflector mechanism (1);

wherein the fixing part (32) comprises a slide hole (321), the locking part (33) comprises a connecting part (331), a constraint part (332), and a locking member (333), and a first end of the connecting part (331) is fixedly connected with the constraint (332), the connecting part (331) is operative to pass through the slip hole (321), and the fixing part (32) is operative to move in a lateral direction so that the connecting part (331) cases with the slide hole (321) in different positions, the teleprompter reflector mechanism (1) comprises a through hole (11) arranged in the longitudinal direction at the teleprompter reflector mechanism (1); when assembling, a second end of the connecting part (331) passes through the slide hole (321) and the through hole (11), and extends to the front side of the teleprompter reflector mechanism (1) and is threaded with the locking member (333) so as to removably connect the fixing part (32) on the back side of the teleprompter reflector mechanism (1).

2. The teleprompter according to claim 1, wherein the clamping mechanism (3) comprises a clamping part (31), a fixing part (32), and a locking part (33), the clamping part (31) is fixedly connected with the fixing part (32), the fixing part (32) is removably connected with the different positions on the back side of the teleprompter reflector mechanism (1) via the locking part (33).

3. The teleprompter according to claim 2, wherein the clamping part (31) is an integrated structure with the fixing part (32).

4. The teleprompter according to claim 1, wherein the slide hole (321) is a rectangular hole along a lateral direction.

5. The teleprompter according to claim 4, wherein the outer circumference of the connecting part (331) close to the constraint part (332) is provided with a square limit part (334), and the longitudinal size of the limit part (334) is consistent with the longitudinal size of the slide hole (321).

6. The teleprompter according to claim 2, wherein the clamping part (31) comprises a base part (311), a first clamping part (312), and a second clamping part (313), the base part (311) is connected to the fixing part (32), the first clamping part (312) is fixedly connected with the base part (311), the second clamping part (313) is arranged, in the lateral direction and at intervals, over against the first clamping part (312), and the second clamping part (313) is retractably arranged with the base part (311).

7. The teleprompter according to claim 1, wherein the teleprompter reflector mechanism (1) comprises a bracket (12), and a sunshade (13) provided above the bracket (12), a shoot hole (14) is provided at the sunshade (13), the clamping mechanism (3) is provided on the bracket (12) and is located below the shoot hole (14).

8. The teleprompter according to claim 7, wherein the display support mechanism (2) is arranged on the front side of the bracket (12), and is removably connected to the bracket (12).

9. The teleprompter according to claim 1, wherein the display support mechanism (2) comprises a frame (21), the upper and lower sides of the frame (21) are provided with a retractable first clip (22) and a retractable second clip (23) respectively.

* * * * *